(12) United States Patent
Otanez et al.

(10) Patent No.: US 9,073,555 B2
(45) Date of Patent: Jul. 7, 2015

(54) CONTROLLING OPERATION OF A VEHICLE BASED ON PARAMETERS LEARNED DURING DRIVER'S OPERATION OF ANOTHER VEHICLE

(75) Inventors: Paul G. Otanez, Troy, MI (US); Shushan Bai, Ann Arbor, MI (US); Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 217 days.

(21) Appl. No.: 13/358,945

(22) Filed: Jan. 26, 2012

(65) Prior Publication Data
US 2013/0197715 A1      Aug. 1, 2013

(51) Int. Cl.
*B60W 50/08* (2012.01)
*B60W 50/00* (2006.01)

(52) U.S. Cl.
CPC ..... *B60W 50/082* (2013.01); *B60W 2050/0082* (2013.01); *B60W 2050/0088* (2013.01); *B60W 2540/28* (2013.01); *B60W 2540/30* (2013.01)

(58) Field of Classification Search
CPC .............. B60W 50/082; B60W 2050/0082; B60W 2050/0088; B60W 2540/28; B60W 2540/30
USPC ................... 701/2, 1, 36, 49, 41, 59
See application file for complete search history.

(56) References Cited

U.S. PATENT DOCUMENTS

| | | | |
|---|---|---|---|
| 6,230,084 B1 * | 5/2001 | Kijima et al. ............... 701/1 |
| 6,784,379 B2 * | 8/2004 | Breed et al. ............... 177/144 |
| 6,917,801 B2 * | 7/2005 | Witte et al. ............... 455/418 |
| 6,947,881 B1 * | 9/2005 | Murakami et al. ............... 703/8 |
| 7,042,347 B2 * | 5/2006 | Cherouny ............... 340/439 |
| 7,062,362 B2 * | 6/2006 | Obradovich et al. ............... 701/1 |
| 7,139,660 B2 * | 11/2006 | Sarkar et al. ............... 701/36 |
| 7,444,241 B2 | 10/2008 | Grimm |
| 7,818,097 B2 * | 10/2010 | Fein et al. ............... 701/1 |
| 7,979,177 B2 * | 7/2011 | Hermann et al. ............... 701/29.6 |
| 8,258,934 B2 * | 9/2012 | Filev et al. ............... 340/435 |
| 8,312,708 B2 * | 11/2012 | Bennet et al. ............... 60/280 |
| 8,370,030 B1 * | 2/2013 | Gurin ............... 701/49 |
| 8,437,919 B2 | 5/2013 | Wang et al. |
| 8,442,699 B2 * | 5/2013 | Takamatsu et al. ............... 701/1 |
| 2007/0150196 A1 | 6/2007 | Grimm |
| 2008/0228358 A1 | 9/2008 | Wang et al. |

FOREIGN PATENT DOCUMENTS

CN     101326511 A     12/2008
CN     101763741 A     6/2010

OTHER PUBLICATIONS

U.S. Appl. No. 14/543,073, filed Nov. 17, 2014, Sczomak et al.

* cited by examiner

*Primary Examiner* — Nicholas Kiswanto (57) ABSTRACT

A system of a first vehicle includes a communication module, a translation module, a driver identification module, and an actuator control module. The communication module receives first vehicle control data generated based on operation of a second vehicle by a driver. The first and second vehicles are different. The translation module determines second vehicle control data based on the first vehicle control data and first characteristics of the first vehicle. The driver identification module selectively indicates when the driver is operating the first vehicle. During operation of the first vehicle by the driver, the actuator module controls at least one actuator of the first vehicle based on the second vehicle control data.

20 Claims, 9 Drawing Sheets

CONTROLLING OPERATION OF A VEHICLE BASED ON PARAMETERS LEARNED DURING DRIVER'S OPERATION OF ANOTHER VEHICLE

FIELD

The present disclosure relates to control systems and methods for vehicles and, more particularly, to control systems and methods for personalizing vehicles to suit a particular driver's preferences.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motor vehicles include various driver interface devices and systems that enable a driver to control the movement of the vehicle from one place to another. The driver interface devices receive inputs from the driver and generate outputs based on the driver inputs. Conventionally, the driver interface devices include an accelerator pedal, a brake pedal, a cruise control system, a steering wheel, and a transmission gear (or range) selector or shifter manipulated by the driver. Various vehicle operating parameters, such as vehicle speed and direction, are determined based on the driver inputs.

The vehicle systems include a powertrain system, a brake system, a steering system, and a suspension system. The powertrain system produces drive torque used to accelerate the vehicle in response to driver inputs to the accelerator pedal and the shifter, and typically includes an engine, a transmission, and a driveline. The engine combusts an air and fuel mixture to produce torque that is transmitted through the transmission at various gear ratios to the driveline, which drives one or more wheels of the vehicle. The brake system includes brakes coupled to the wheels that produce braking torque used to decelerate the vehicle to a stop in response to driver inputs to the brake pedal. The steering system includes a steering wheel and various components coupling the steering wheel to the wheels that enable a driver to navigate the vehicle along a desired course. The suspension system includes a system of springs, shock absorbers, and linkages that connect the vehicle to the wheels. The suspension system contributes to the vehicle's road holding or handling and braking for safe navigation and driving pleasure, and serves to isolate vehicle occupants from road noise, bumps, and vibrations.

Each vehicle system includes one or more actuators for moving or controlling various subsystems and/or components and thereby varying various vehicle operating parameters. For example, a throttle of the engine may control engine air flow and thereby control engine torque output. Clutches and hydraulic pistons may control transmission gear ratio. A master cylinder may control braking force. Control systems have been developed to control operation of the actuators. In some control systems, one or more control modules alone, or in combination, generate control signals that are used to control the operation of the actuators. The actuators operate in response to the control signals, which are based on actuator values. Through control of the actuators, control systems can control various vehicle operating characteristics such as vehicle responsiveness and feel, and vehicle fuel economy.

SUMMARY

A system of a first vehicle includes a communication module, a translation module, a driver identification module, and an actuator control module. The communication module receives first vehicle control data generated based on operation of a second vehicle by a driver. The first and second vehicles are different. The translation module determines second vehicle control data based on the first vehicle control data and first characteristics of the first vehicle. The driver identification module selectively indicates when the driver is operating the first vehicle. During operation of the first vehicle by the driver, the actuator module controls at least one actuator of the first vehicle based on the second vehicle control data.

In other features, a method of controlling a first vehicle includes: receiving first vehicle control data generated based on operation of a second vehicle by a driver; determining second vehicle control data based on the first vehicle control data and first characteristics of the first vehicle; selectively indicating when the driver is operating the first vehicle; and, during operation of the first vehicle by the driver, controlling at least one actuator of the first vehicle based on the second vehicle control data. The first and second vehicles are different.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
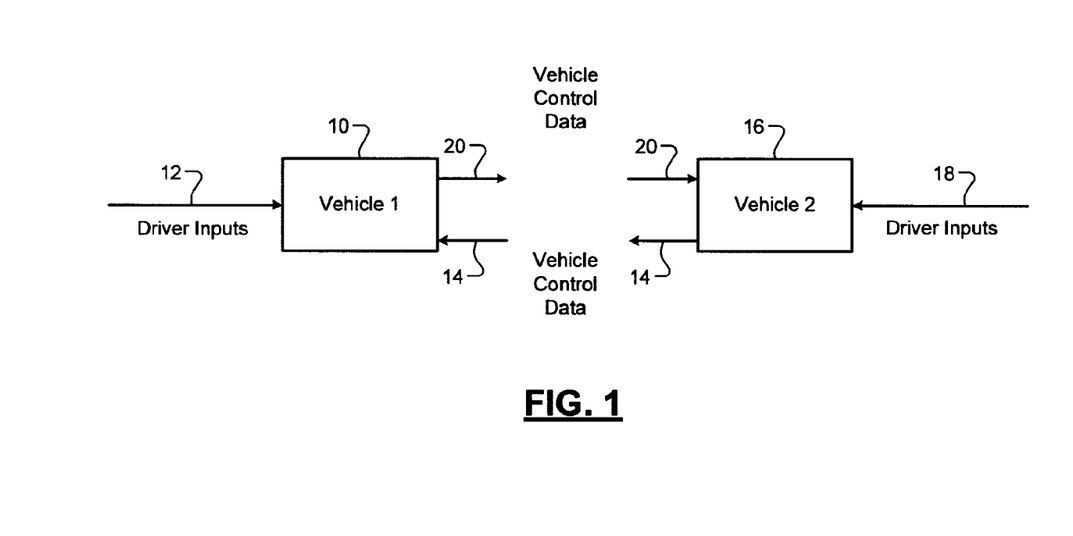
FIG. 1 is a functional block diagram illustrating communication of driver-based vehicle control data between vehicles according to the present disclosure.

With particular reference to FIG. 1, a functional block diagram illustrates communication of driver-based vehicle control data between vehicles according to the present disclosure. The present disclosure provides a system and method for controlling operation of a first vehicle 10 based on driver inputs 12 to the first vehicle 10 by a particular driver and one or more driver-based operating (DBO) characteristics determined by a second vehicle. The system and method of the present disclosure provide an efficient way of transferring driver preferences or tendencies learned by one vehicle to other vehicles that the driver may drive, thereby reducing convergence time.

The DBO characteristics are determined by a second vehicle 16 based on driver inputs 18 by the same driver to the second vehicle 16. Generally, the DBO characteristics express a tendency or a preference of the driver for a particular operating or performance characteristic such as a level of responsiveness. The operating characteristic may be expressed qualitatively or quantitatively. The DBO characteristics are embodied in vehicle control data 14 generated by the second vehicle 16 that is communicated to the first vehicle 10.

The DBO characteristics include driver-controllable DBO characteristics and non-driver-controllable or learned DBO characteristics. Driver-controllable DBO characteristics generally include characteristics that a driver may control directly through specific driver inputs to a driver interface device. For example, a driver may depress a button on a transmission gear selector to select between a first operating mode and a second operating mode. The first operating mode may employ a first transmission shift schedule configured to maximize fuel economy, while the second operating mode may employ a second transmission schedule configured to maximize vehicle responsiveness. Learned DBO characteristics generally include characteristics determined based on one or more control values that are periodically adjusted over time to meet an apparent driver preference regarding the characteristics. For example, driver inputs to an accelerator pedal and/or the transmission gear selector over time may indicate a driver prefers power and/or responsiveness over fuel economy or vice versa. Throttle response times may be decreased and transmission shift points may be adjusted to meet the driver preference for power.

According to the present disclosure, the DBO characteristics include powertrain operating characteristics, suspension operating characteristics, and steering system operating characteristics as discussed in further detail below. By way of example and not limitation, the powertrain operating characteristics include characteristics associated with engine responsiveness and feel, including active fuel management control and cylinder deactivation, deceleration fuel cutoff control, accelerator pedal progression control, engine start-stop control, and transmission shift points and clutch slip schedules. The suspension operating characteristics include characteristics associated with vehicle ride and feel, including regenerative braking. The steering system operating characteristics include characteristics associated with steering responsiveness, effort, and feel. In various aspects, operation of the second vehicle 16 can be controlled based on one or more DBO characteristics embodied in vehicle control data 20 determined by the first vehicle 10 based on the driver inputs 12 and/or the vehicle control data 14. The vehicle control data 14, 20 can be communicated from one vehicle to the other via various communication methods as discussed in further detail below.

Figure 2:
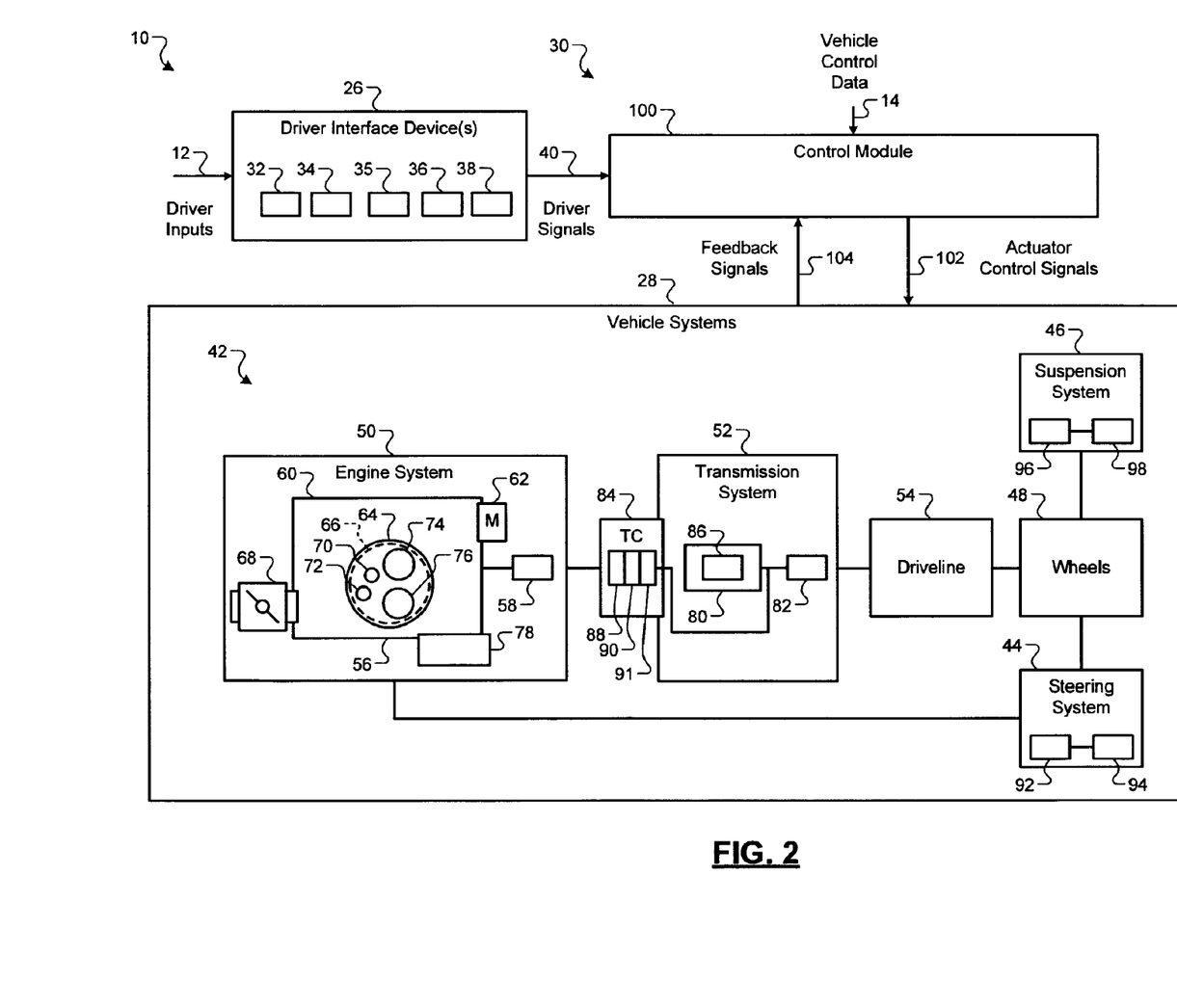
FIG. 2 is a functional block diagram illustrating an example vehicle according to the present disclosure.

With particular reference to FIG. 2, a functional block diagram illustrates an example implementation of the first vehicle 10 according to the present disclosure. Generally, the first vehicle 10 is reconfigurable to meet apparent preferences of a particular driver for particular vehicle operating characteristics as determined by the second vehicle 16. The vehicle operating characteristics are conveyed by the vehicle control data 14 generated by the second vehicle 16 based on the driver inputs 18 by the same driver to the second vehicle 16. In various aspects, the vehicle control data 14 includes identifiers and other information pertinent to translating the data into data adapted for use by the first vehicle 10. For example, the vehicle control data 14 may identify the physical attributes, the vehicle systems, and the actuators of the second vehicle 16. The vehicle control data 14 may further specify control values associated with the vehicle systems and actuators.

The first vehicle 10 includes driver interface devices 26, vehicle systems 28, and a vehicle personalization system 30. The driver interface devices 26 include various devices manipulated by the driver to convey a desired vehicle speed, vehicle acceleration, and direction of travel. The driver interface devices 26 include an accelerator pedal 32, a brake pedal 34, a cruise control system 35, a transmission range selector 36, and a steering wheel 38. In various aspects, the driver interface devices 26 include other driver input devices such as switches, knobs, buttons, and the like, manipulated by the driver to convey a desired mode of vehicle operation. The driver interface devices 26 generate driver signals 40 based on the driver inputs 12 to the first vehicle 10.

The vehicle systems 28 include a powertrain system 42, a steering system 44, and a suspension system 46. The powertrain system 42 is a system of components that drive one or more wheels 48 of the first vehicle 10, referred to herein as driven wheels. The powertrain system 42 includes an engine system 50, a transmission system 52, and a driveline 54. The present disclosure is not limited to conventional powertrains or hybrid powertrains, and may implement a drive-by-wire system. The present disclosure is also not limited to powertrains of a particular layout or drivelines of a particular type. For example, the powertrain system 42 may have a front-wheel-drive layout, a rear-wheel-drive layout, or an all-wheel drive layout. The present disclosure is also not limited to transmission systems of a particular type. For example, the transmission system 52 may include an automatic transmission, a manual transmission, or a continuously variable drive ratio transmission (CVT).

The engine system 50 includes a system of engine components 56 and engine actuators 58 operably coupled to the engine components 56. The engine components 56 produce drive torque that is output to the transmission system 52. As illustrated by the present non-limiting example, the engine system 50 may be a start-stop type hybrid engine system including an internal combustion engine (ICE) 60 and an electric motor 62. The ICE 60 is presented as a reciprocating type, direct-injection spark-ignition engine having a single cylinder 64. A piston 66 reciprocates within the cylinder 64 and drives rotation of a crankshaft (not shown). While a single cylinder is presented for simplicity, it will be appreciated that the ICE 60 can have additional cylinders.

The ICE 60 includes an intake system including a throttle 68, a fuel system including a fuel injector 70, an ignition system including a spark plug 72, a valve train including an intake valve 74 and an exhaust valve 76, and an exhaust system 78. The intake system distributes intake air entering the ICE 60 to the cylinder 64, and the throttle 68 controls a mass air flow (MAF) of the intake air. The fuel system supplies fuel under pressure to the fuel injector 70, and the fuel injector 70 controls an amount of fuel injected into the cylinder 64. The ignition system supplies energy to the spark plug 72, and the spark plug 72 supplies a spark that initiates combustion within the cylinder 64. The intake valve 74 controls the flow of intake air into the cylinder 64 and the exhaust valve 76 controls the flow of exhaust out of the cylinder 64.

During operation of the ICE 60, intake air is drawn into the cylinder 64 through the throttle 68 and mixes with fuel supplied by the fuel injector 70 to create an air-fuel charge. The air-fuel charge is compressed by the piston 66 and subsequently ignited. The air-fuel charge may be ignited by the spark provided by the spark plug 72. Combustion of the air-fuel charge drives the piston 66. The piston 66 in turn drives the crankshaft and produces the drive torque. Exhaust produced by the combustion is forced out of the cylinder 64 through the exhaust valve 76 by the piston 66. The exhaust system 78 receives the exhaust from the cylinder 64 and treats the exhaust before expelling the exhaust to surroundings.

The electric motor 62 may be part of a start-stop system that may selectively shuts down and restarts the ICE 60 when the first vehicle 10 is stopped based on various criteria. The electric motor 62 is drivingly coupled to the ICE 60 and is operable to crank and start the ICE 60. The engine actuators 58 move and/or control various engine components 56 in response to engine control signals received from the vehicle personalization system 30. The engine actuators 58 are operable to vary one or more engine operating characteristics such as engine responsiveness and fuel economy. More specifically, each of the engine actuators 58, alone or in combination with another actuator, are operable to vary one or more engine operating parameters and thereby vary an engine operating characteristic.

According to the present disclosure, the engine actuators 58 include any actuator or actuator system operable in response to one or more control signals, for example electronic control signals, to vary an engine operating parameter. By way of example and not limitation, the engine actuators 58 may control engine operating parameters such as MAF into the ICE 60, fuel timing and amount, spark timing and energy, and intake and exhaust valve timing (e.g., phasing and duration) and/or lift. According to the present example, the engine actuators 58 include actuators operably coupled to the throttle 68 for varying throttle position and engine air flow, the fuel injector 70 for varying fuel timing and amount, the spark plug 72 for varying spark timing and energy, and the intake and exhaust valves 74, 76 (and/or camshafts) for varying intake and exhaust valve timing and/or lift.

The transmission system 52 includes a system of transmission components 80 and transmission actuators 82 operably coupled to the transmission components 80. The transmission components 80 receive the drive torque output by the engine system 50 and transmit the drive torque to the driveline 54 at one of multiple gear ratios. As illustrated by the present non-limiting example, the transmission system 52 may be an automatic transmission system that includes a torque converter 84 and a gear train 86.

The torque converter 84 is a fluid coupling that transmits drive torque from the engine system 50 to the gear train 86. The torque converter 84 includes an impeller 88, a turbine 90, and a torque converter clutch 91. The impeller 88 is drivingly coupled to the crankshaft of the ICE 60 and the turbine 90 is drivingly coupled to the gear train 86. Rotation of the impeller 88 drives rotation of the turbine 90. The gear train 86 includes selectively engageable meshing gear sets, each gear set for transmitting torque at a particular gear ratio.

The transmission actuators 82 may move and/or control various transmission components 80 in response to transmission control signals received from the vehicle personalization system 30. In various aspects, the transmission actuators 82 may include rotary and/or band clutches, shift fork linkage mechanisms, synchronizers, pressure control devices, and the like. According to the present disclosure, the transmission actuators 82 include any actuator or actuator system operable in response to one or more control signals to vary a transmission operating parameter. By way of example and not limitation, the transmission actuators 82 include actuators operably coupled to the transmission components 80 for varying the gear ratio, transmission slip speed, clutch slip speed, torque converter clutch slip speed, and shift delay. Shift delay may refer to a shift period between gear ratios.

As used herein, transmission slip speed may refer to a difference between an actual rotational speed of an output shaft and an estimated rotational speed of the output shaft when the gear train 86 is fully engaged in the selected gear ratio. Clutch slip speed may refer to a difference between a rotational speed of the driving or input member of a clutch and a rotational speed of the driven or output member of the clutch. Torque converter slip speed may refer to a difference between a rotational speed of the impeller 88 and a rotational speed of the turbine 90.

The driveline 54 receives the drive torque output by the transmission system 52 and transmits the drive torque to the driven wheels. Together, the engine system 50, the transmission system 52, and the driveline 54 are operable to vary one or more powertrain operating characteristics such as engine responsiveness and feel, transmission responsiveness and feel, and vehicle fuel economy. Alone or together, the engine actuators 58 and the transmission actuators 82 can be used to achieve a particular desired powertrain operating characteristic.

The steering system 44 includes a system of steering components 92 that allow the first vehicle 10 to follow a desired course and steering actuators 94 operably coupled to the steering components 92. The present disclosure is not limited to steering systems of a particular type. For example, the steering system 44 may be of the rack and pinion, recirculating ball, or worm and sector type. Additionally, the steering system 44 may be a semi-active or active system and, in various aspects, may implement a steer-by-wire system. The steering components 92 connect the steering wheel 38 to one or more of the wheels 48 (typically one or more pairs of wheels), generally referred to herein as steered wheels. In various aspects, the steering components 92 may include, for example, various linkages, rods, pivots, and/or gears.

The steering actuators 94 move and/or control various steering components in response to steering control signals received from the vehicle personalization system 30. The steering actuators 94 are operable to vary one or more steering operating characteristics such as steering response and steering feel or effort. In various aspects, the steering actuators 94 may include, for example, an engine-driven hydraulic pump system and/or a linear or rotary electric motor that assists the motion of turning the steered wheels. According to the present disclosure, the steering actuators 94 include any actuator or actuator system operable in response to one or more control signals to vary a steering operating parameter. By way of example and not limitation, the steering actuators 94 include actuators operably coupled to the steering components 92 for varying steering gear angle and steering assist torque.

The suspension system 46 is a system of suspension components 96 that connect the wheels 48 to the rest of the first vehicle 10 and suspension actuators 98 operably coupled to the suspension components 96. The present disclosure is not limited to suspension systems of a particular type. For example, the suspension system 46 may be a dependent suspension, an independent suspension, or a semi-dependent suspension. Additionally, the suspension system 46 may be a semi-active or active suspension system. The suspension components 96 support the rest of the first vehicle 10 on the wheels 48. In various aspects, the suspension components 96 include, for example, springs, shock absorbers, and linkages.

The suspension actuators 98 move and/or control various suspension components 96 in response to suspension control signals received from the vehicle personalization system 30. The suspension actuators 98 are operable to vary one or more suspension operating characteristics, such as suspension ride and suspension feel. In various aspects, the suspension actuators 98 include, for example, hydraulic, pneumatic, electric, and/or electromagnetic actuators that vary spring rates of the springs, damping ratios of the shock absorbers, and/or assist in moving or controlling the linkages. By way of example and not limitation, the suspension actuators 98 may control suspension operating parameters such as spring rate or wheel rate, weight transfer between the wheels 48 during cornering, suspension travel, damping, camber control, roll center height, instant center, anti-dive and anti-squat, and the like.

The vehicle personalization system 30 includes a control module 100 that controls operation of the vehicle systems 28 and implements control of the first vehicle 10 according to the present disclosure. In particular, the control module 100 controls the drive torque produced by the engine system 50 and the gear ratio in which the transmission system 52 is operated. The control module 100 also adjusts one or more control values used to control operation of the vehicle systems 28 based on the vehicle control data 14 received from the second vehicle 16. In this way, the control module 100 can control operation of the first vehicle 10 to meet the driver's preferences for particular vehicle operating characteristics that were determined based on the driver's operation of the second vehicle 16.

Generally, the control module 100 controls operation by generating actuator control signals 102 based on the driver signals 40, the vehicle control data 14, and feedback signals 104 generated by the vehicle systems 28. The actuator control signals 102 include the control signals received by the engine actuators 58, the transmission actuators 82, the steering actuators 94, and the suspension actuators 98. In various aspects, the actuator control signals 102 include timed control signals synchronized to one of a master clock timing and crankshaft position. The feedback signals 104 include sensor signals generated by various sensors used to measure vehicle operating parameters.

Figure 3:
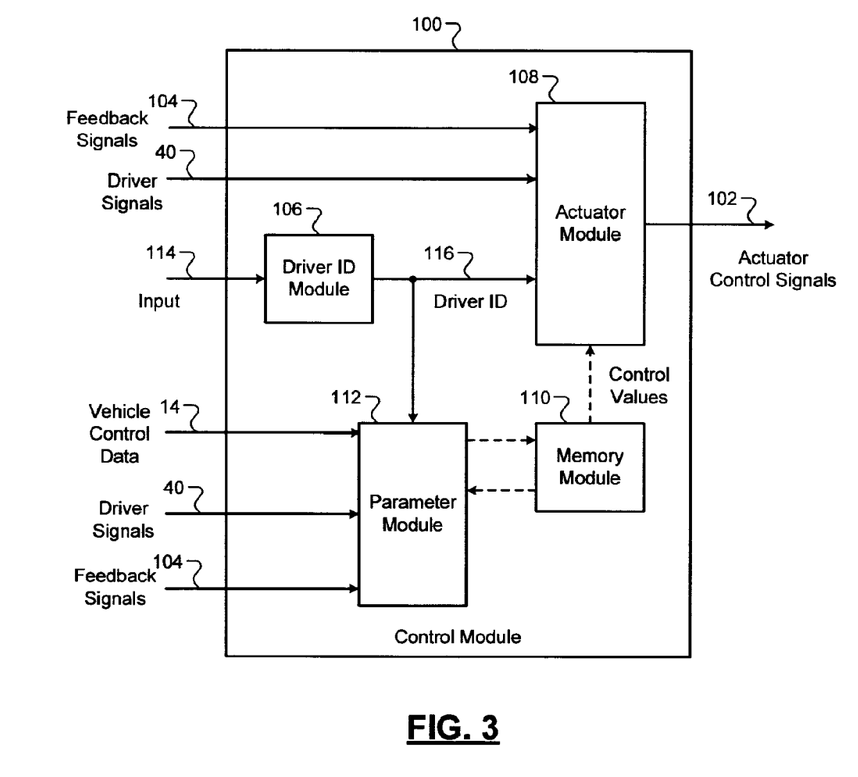
FIG. 3 is a functional block diagram illustrating an example control module according to the present disclosure.

With particular reference to FIG. 3, a functional block diagram illustrates an example implementation of the control module 100. The control module 100 includes a driver identification (ID) module 106, an actuator module 108, a memory module 110, and a parameter module 112. The driver ID module 106 determines the identity of the current driver of the first vehicle 10 based on an input 114 and outputs the identity in a driver ID signal 116. The driver ID module 106 may determine the driver by any suitable method. For example, the driver ID module 106 may employ a radio frequency identification (RFID) method and determine the identity based on a RFID tag input read from a remote keyless entry transmitter (i.e., key fob) used by the driver. As another example, the driver ID module 106 may receive an input indicative of the driver's identity generated by inputs made by the driver to indicate his or her identity. When the input 114 is not received or the driver ID module 106 cannot determine the identity of the current driver from the input 114, the driver ID module 106 may output a predetermined generic driver identity in the driver ID signal 116.

The actuator module 108 generates the actuator control signals 102 to achieve a desired vehicle speed, vehicle acceleration, and direction of travel indicated by the driver. The actuator module 108 generates the actuator control signals 102 based on the identity of the driver, various vehicle operating conditions, and other inputs so that the vehicle systems 28 are operated in a manner consistent with the driver's apparent preferences for particular vehicle operating characteristics. The other inputs include the driver signals 40, the feedback signals 104, and the driver ID signal 116.

In various aspects, the actuator module 108 determines an actuator control value for each of the actuators 58, 82, 94, 98 in order to achieve the desired vehicle speed, acceleration, and direction of travel. The actuator module 108 then generates the actuator control signals 102 based on the actuator control values. Each actuator control value corresponds to an associated operating parameter and may correspond to more than one operating parameter. For example only, the actuator control value for the throttle 68 may be a throttle opening area corresponding to a desired MAF for achieving a desired engine torque. The actuator module 108 may output a throttle control signal to rotate a blade of the throttle 68 to achieve the throttle opening area.

Actuator control values for the other engine actuators 58 may correspond to fueling rate and timing, intake and exhaust valve timing and/or lift, spark timing, accelerator pedal progression, and/or start-stop aggressiveness. Actuator control values for the transmission actuators 82 may correspond to shift point, shift delay, torque converter slip speed, and/or clutch slip speed. Actuator control values for the steering actuators 94 may correspond to steering assist torque and steering gear angle. Actuator values for the suspension actuators 98 may correspond to spring rate, wheel rate, weight transfer rate, suspension travel, shock damping, wheel camber, roll center height, and instant center.

Each actuator control value may be determined as a function of one or more vehicle operating parameters. For example, a relationship expressing the actuator control value as a function of the one or more vehicle operating parameters may be defined and the relationship may be modeled by an equation and/or may be stored as a memory lookup table. Each equation may include a control value associated with each of the vehicle operating parameters such as a scalar or gain (i.e., coefficient), a power, or an offset. The control values may be stored in a memory lookup table. Other memory lookup tables may include a set of actuator values, which generally may be referred to as control values, indexed according to one or more associated vehicle operating parameters. The control values may be stored in non-volatile memory for retrieval by the actuator module 108 when determining the actuator control values. As illustrated by the present non-limiting example, a unique set of control values for a particular driver may be stored in the memory module 110 for retrieval based on the identity of the driver.

Figure 4A:
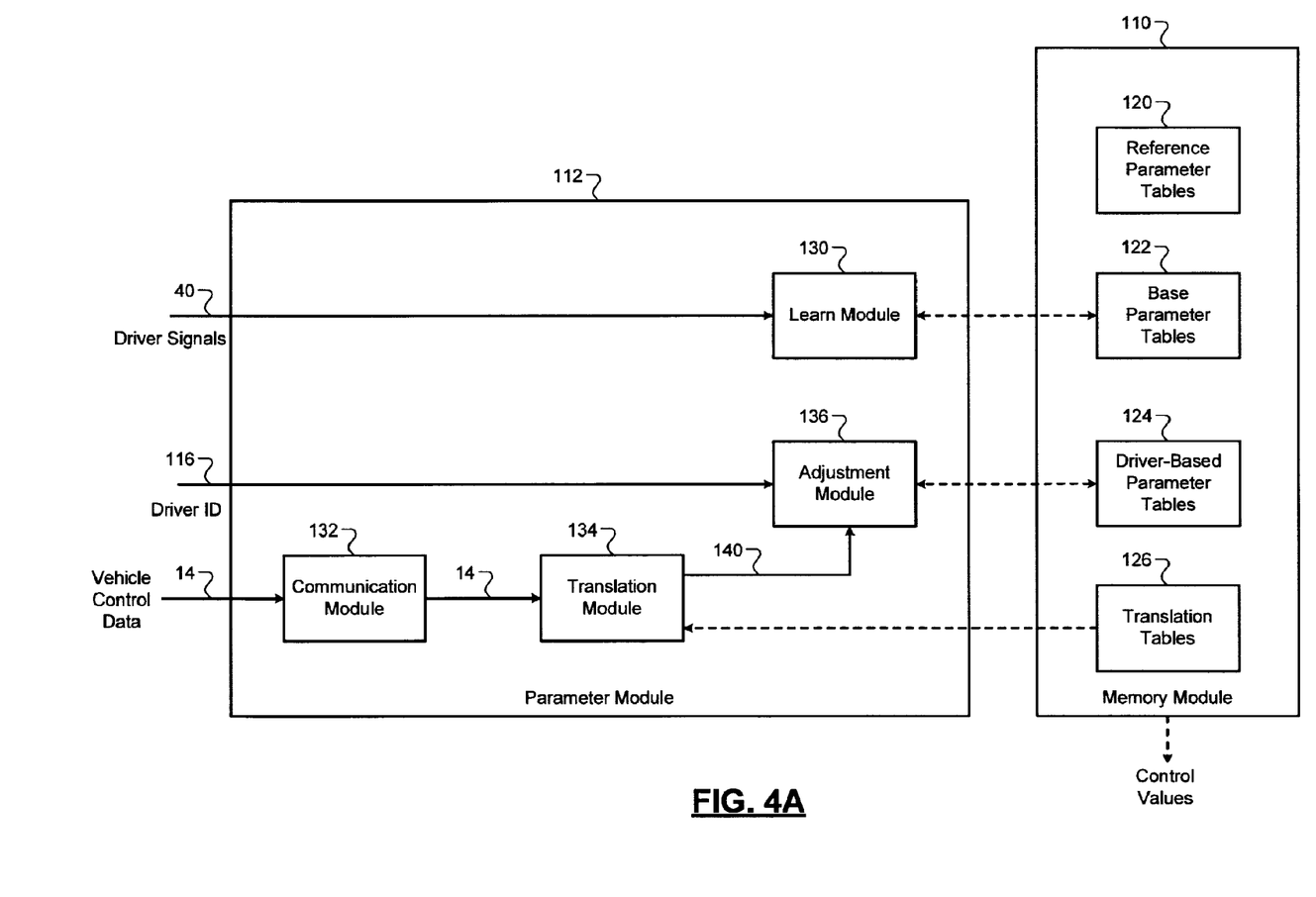
FIG. 4A is a functional block diagram illustrating an example parameter module and memory module according to the present disclosure.

With additional reference to FIG. 4A, a functional block diagram illustrates an example implementation of the memory module 110. The memory module 110 includes non-volatile memory where reference parameter tables 120, base parameter tables 122, driver-based parameter tables 124, and translation tables 126 are stored, each including a set of control values. The reference parameter tables 120 include a predetermined set of unique control values that serve as baseline control values that can be used to initially set and subsequently selectively reset corresponding control values stored in the base parameter tables 122 or the driver-based parameter tables 124. The control values stored in the reference parameter tables 120 may or may not be different than the corresponding control values stored in the base parameter tables 122 and/or the corresponding control values stored in the driver-based parameter tables 124.

The base parameter tables 122 include a set of control values that are used by the actuator module 108 to control operation during periods of vehicle operation when the identity of the driver is unknown or unspecified. Initially, the control values stored in the base parameter tables 122 can be set to the respective control values of the reference parameter tables 120. In various aspects, the control values stored in the base parameter tables 122 are periodically adjusted by the parameter module 112 based on observed driver preferences determined based on the driver inputs 12 over time. As such, the base parameter tables 122 include control values which are unique from the respective control values stored in the reference parameter tables 120.

The driver-based parameter tables 124 include unique tables for each identified driver, each including a set of control values that are used by the actuator module 108 to control operation during periods of vehicle operation when the identity of the driver is known and/or specified. According to the present disclosure, the control values are based on the vehicle control data 14 and, in various aspects, also based on the driver inputs 12, as described in further detail below.

Initially, the control values stored in the driver-based parameter tables 124 can be set to the respective control values of the reference parameter tables 120. Subsequently, the control values can be selectively adjusted (learned) by the parameter module 112 based on the vehicle control data 14. The control values can be further adjusted based on observed driver preferences determined based on the driver inputs 12 over time. As such, the driver-based parameter tables 124 include control values which are unique from the respective control values stored in the reference parameter tables 120 and the base parameter tables 122.

The translation tables 126 include tables of information used by the parameter module 112 to translate the vehicle control data 14 to control data adapted for use by the actuator module 108. In various aspects, the tables account for a predetermined number of vehicles from which the vehicle control data 14 may be obtained, as well as differences among the various powertrain systems and actuators of the vehicles. The tables may be indexed by one or more parameters including vehicle model, powertrain, vehicle system, and actuator. The information in each table includes a set of constraints associated with the first vehicle 10 against which the vehicle control data 14 is compared.

Generally, the constraints included in the appropriate table reconcile differences between the vehicle systems 28 of the first vehicle 10 and those of the second vehicle 16. The constraints reconcile the differences in a manner that achieves the vehicle operating characteristics embodied in the vehicle control data 14 in a predetermined way. In various aspects, the constraints express control limits associated with the vehicle systems 28, and their actuators and actuator systems. The constraints may be embodied in logical expressions, mathematical equations and functions, and other comparative representations or limiting expressions for translating the vehicle control data 14. The constraints may provide that certain data of the vehicle control data 14 is to be ignored, limited, or adjusted when determining the control data to be used by the first vehicle 10.

According to the present disclosure, the parameter module 112 periodically adjusts the control values stored in the base parameter tables 122 and the driver-based parameter tables 124 to meet the apparent driver preferences for particular vehicle operating characteristics. To this end, the parameter module 112 adjusts the control values stored in both the base parameter tables 122 and the driver-based parameter tables 124 based on the driver inputs 12 and the feedback signals 104 over time. The control values in the base parameter tables 122 are adjusted during periods when the driver's identity is unknown or unspecified. The control values in the driver-based parameter tables 124 are adjusted during periods when the driver's identity is known or specified. The parameter module 112 further adjusts the control values stored in the driver-based parameter tables 124 in response to the receipt of the vehicle control data 14.

With particular reference to FIG. 4A, a functional block diagram illustrates an example implementation of the parameter module 112 according to the present disclosure. The parameter module 112 includes a learn module 130, a communication module 132, a translation module 134, and an adjustment module 136. The learn module 130 determines driver preferences for particular vehicle operating characteristics and adjusts the control values in the base parameter tables 122 to meet the driver preferences. In various aspects, the learn module 130 adjusts the control values regardless of the particular driver operating the first vehicle 10. The driver preferences may be determined based on the driver inputs 12, for example, from repetitive driver inputs or driver inputs of a particular nature (e.g., repetitive rapid movement of the accelerator pedal).

The communication module 132 is adapted to receive the vehicle control data 14 in a predetermined manner. In various aspects, the communication module 132 is adapted to receive the vehicle control data 14 by one or more wired and wireless communication methods.

Figure 4B:
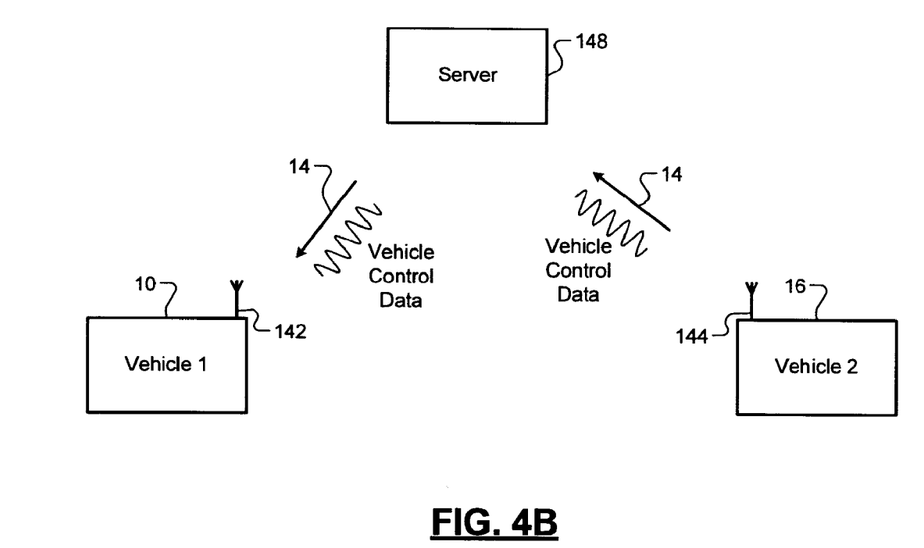
FIGS. 4B-4F are functional block diagrams illustrating example communications systems according to the present disclosure.

FIG. 4B includes an example wireless communication system. Referring now to FIG. 4B, the first vehicle 10 may include a first antenna 142, and the second vehicle 16 may include a second antenna 144. The vehicle control data 14 obtained based on the driver's operation of the second vehicle 16 may be wirelessly transmitted from the second vehicle 16 to a server 148. For example only, the server 148 may include an OnStar server. The server 148 may wirelessly transmit the vehicle control data 14 to the first vehicle 10 when requested. The communication module 132 may receive the vehicle control data 14 via the first antenna 142.

Figure 4C:
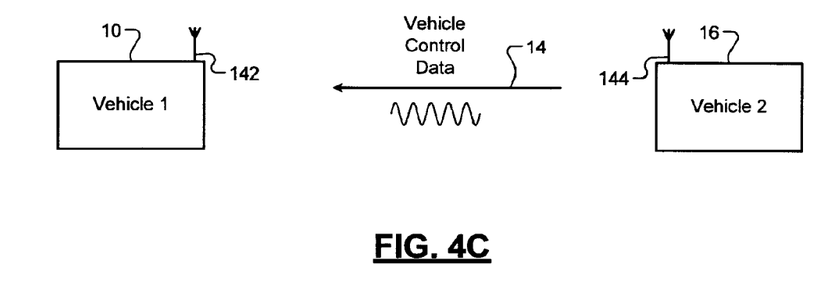

FIG. 4C includes another example wireless communication system. Referring now to FIG. 4C, the vehicle control data 14 may be wirelessly transmitted from the second vehicle 16 directly to the first vehicle 10. For example only, the first and second vehicles 10, 16 may communicate via a Bluetooth connection, a dedicated short range communication (DRSC) connection, or another suitable type of short range wireless communication.

Figure 4D:
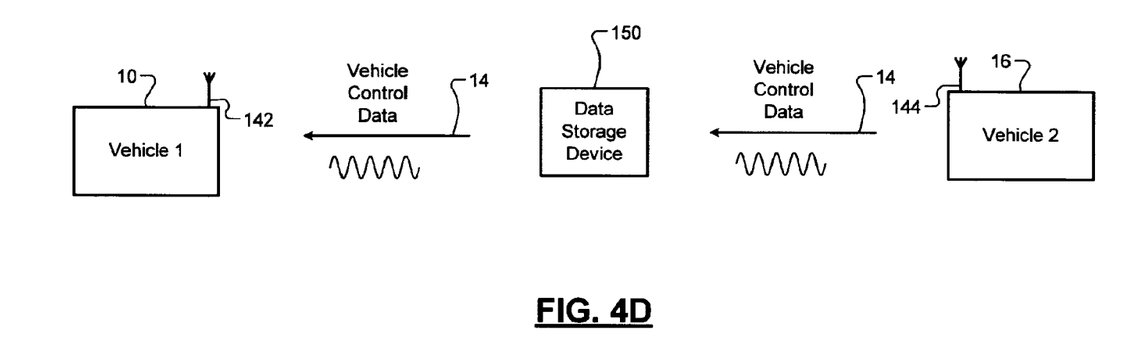

FIG. 4D includes another example wireless communication system. Referring now to FIG. 4D, the vehicle control data 14 may be wirelessly transmitted from the second vehicle 16 to a data storage device 150 when requested. For example only, the data storage device 150 may be implemented with an automotive keyless entry device (e.g., key fob), an ignition key, a mobile phone, a mobile handheld device, etc. The first vehicle 10 may obtain the vehicle control data 14 via the data storage device 150.

Figure 4E:
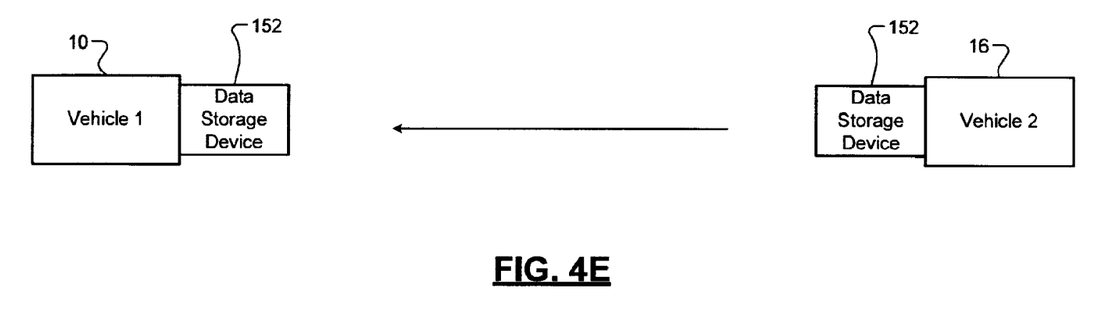

FIG. 4E includes an example wired communication system. Referring now to FIG. 4E, a data storage device 152 may be connected to a input/output (I/O) port of the second vehicle 16 to receive the vehicle control data 14. For example only, the data storage device 152 may connect to a universal serial bus (USB) port, an On Board Diagnostic (OBD) port, or another suitable type of I/O port. Once the vehicle control data 14 has been stored on the data storage device 152, the data storage device 152 can be connected to an I/O port of the first vehicle 10. The first vehicle 10 can receive the vehicle control data 14 via the data storage device 152. In various implementations, a combination of wired (via connection to an I/O port) and wireless communication between (to or from) a vehicle and the data storage device 152 may be used.

Figure 4F:
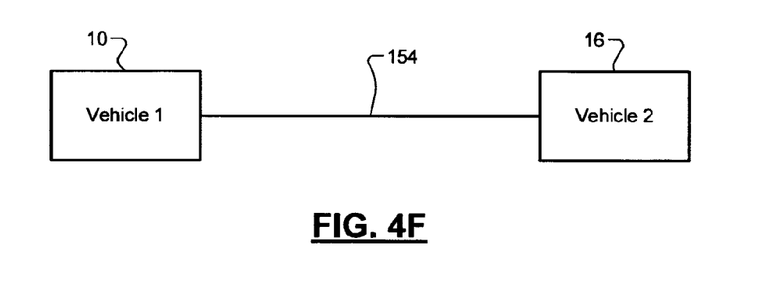

FIG. 4F includes another example wired communication system. Referring now to FIG. 4F, in various implementations, a wired connection 154 between I/O ports of the first and second vehicles 10, 16 may be used to transmit the vehicle control data 14 from the second vehicle 16 to the first vehicle 10.

Referring back to FIG. 4A, the vehicle control data 14 may automatically be transmitted to the communication module 132 upon connection and/or at the initiation of the driver. Upon receipt of the vehicle control data 14, the communication module 132 communicates the vehicle control data 14 to the translation module 134.

The translation module 134 determines vehicle control data 140 used to update the driver-based parameter tables 124 based on the vehicle control data 14 communicated and the corresponding constraints retrieved from the translation tables 126. In various aspects, the vehicle control data 140 includes control values adapted for use with the various actuators and actuator systems of the vehicle systems 28 to achieve the vehicle operating characteristics conveyed and/or embodied in the vehicle control data 14. The translation module 134 uses the identifier and indexing information to retrieve constraints from the translation tables 126 for each vehicle operating characteristic and control value of the vehicle control data 14. The translation module 134 then generates a set of data that is communicated in the vehicle control data 140 including identifiers, indexing information, control values, and other information conveying an associated set of operating characteristics.

The adjustment module 136, in response to receiving the vehicle control data 140, adjusts the driver-based parameter tables 124 based on the identity of the driver and the vehicle control data 140. More specifically, the adjustment module 136 replaces the control values stored in the driver-based parameter tables 124 for the identified driver with the new respective control values included in the vehicle control data 140.

Figure 5:
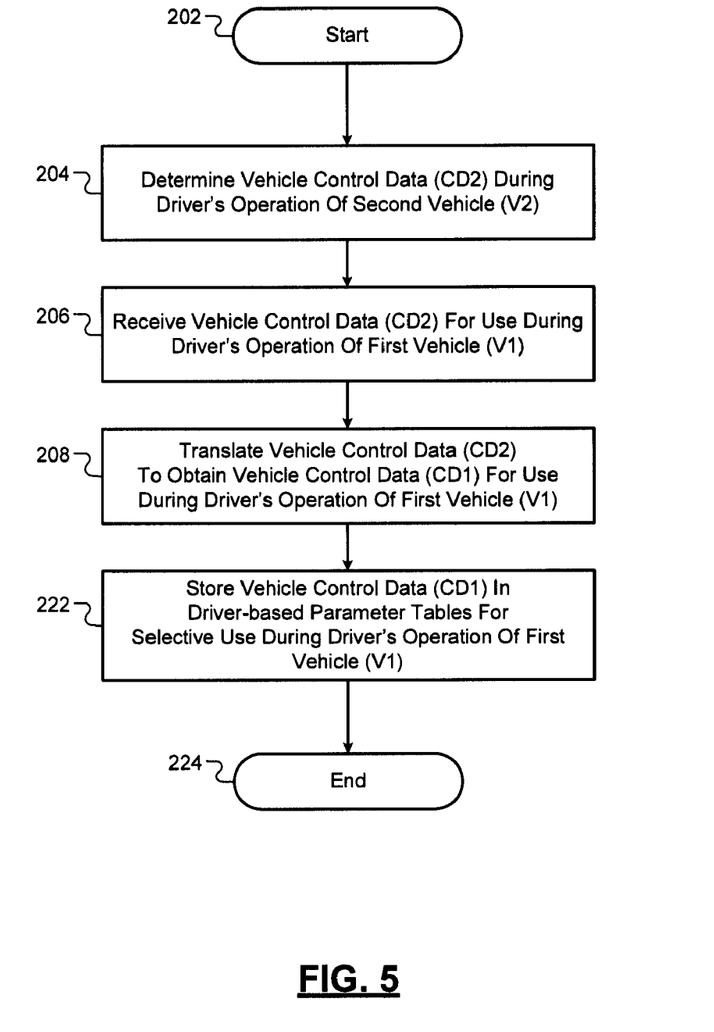
FIGS. 5-6 are flow charts illustrating an example method for personalizing vehicles according to the present disclosure.
Figure 6:
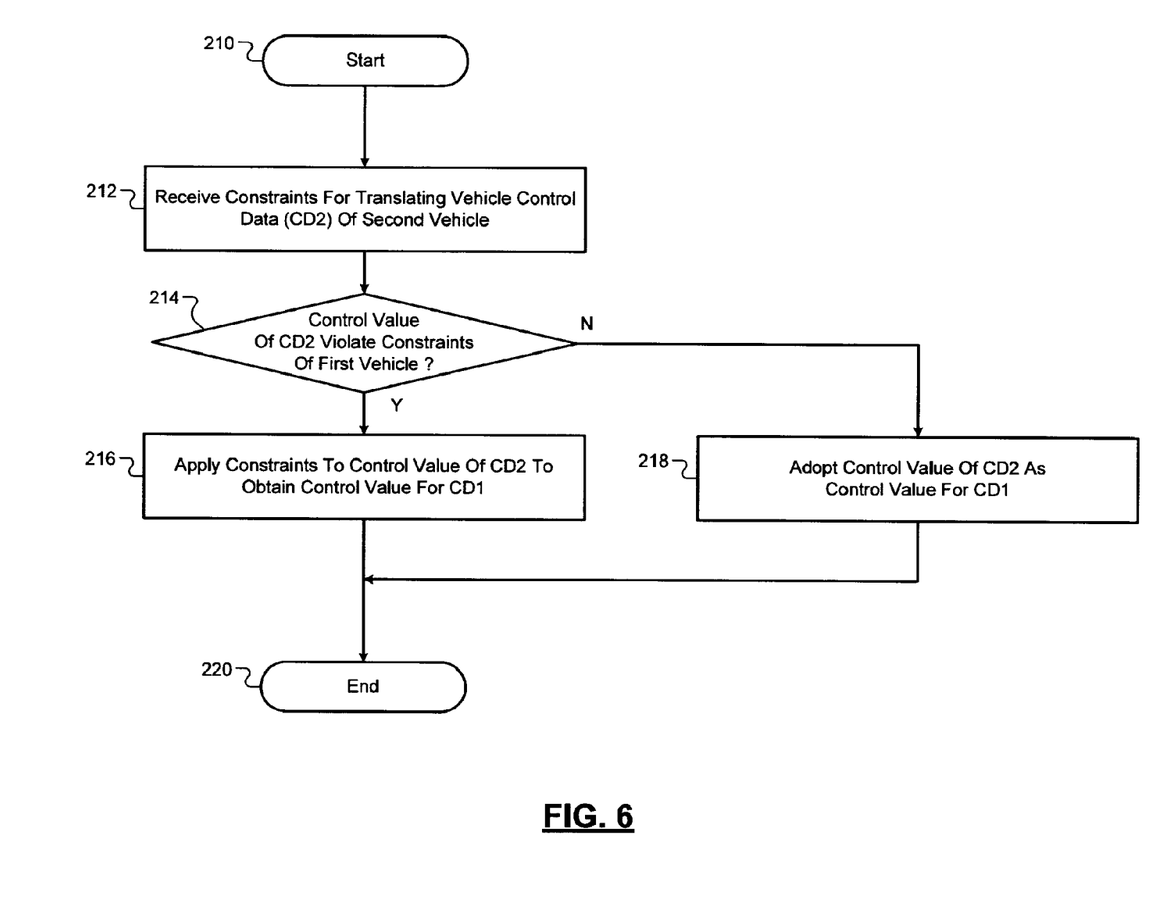

With particular reference to FIGS. 5-6, flowcharts illustrate an example method for controlling operation of a first vehicle during use by a driver based on vehicle control data generated based on operation of a second vehicle by the driver. For convenience, the method will be described with reference to the vehicle personalization system 30 of the first vehicle 10, and the vehicle control data 14 generated by the second vehicle 16 as discussed above. In this way, operation of the various components of the vehicle personalization system 30 may be described and more fully understood.

A start of the method is designated by reference numeral 202. At 204, the second vehicle 16 generates the vehicle control data 14 for a particular driver based on the driver inputs 18 made by the driver during operation of the second vehicle 16. At 206, the communication module 132 of the first vehicle 10 receives the vehicle control data 14 generated based on the driver's operation of the second vehicle 16. In various aspects, the driver facilitates the communication. For example, the driver may connect a USB device to the second vehicle 16 and store the vehicle control data 14 on the USB device. The driver may then disconnect the USB device from the second vehicle 16 and connect the USB device to the first vehicle 10, causing the stored vehicle control data 14 to be communicated to the communication module 132. As another example, the driver may upload the vehicle control data 14 to a personal cellular phone and download the vehicle control data 14 to the first vehicle 10 using the cellular phone. As yet another example, the driver may initiate a request via a remote data server to retrieve the vehicle control data 14 from the second vehicle 16. The driver may initiate communication prior to starting the first vehicle 10 or while operating the first vehicle 10. In other aspects, the driver can control whether all or a subset of the vehicle control data 14 is communicated by specifying which preferences are to be communicated to the communication module 132.

At 208, the translation module 134 translates the vehicle control data 14 obtained from the second vehicle 16 to generate the vehicle control data 140 for use in controlling operation of the first vehicle 10. With particular reference to FIG. 6, a flow diagram illustrates example steps for translating a control value (or set of related control values) of the vehicle control data 14. In various aspects, the steps are performed for each control value of the vehicle control data 14.

A start is designated at 210, while an end is designated at 220. At 212, the translation module 134 retrieves a set of constraints from the translation tables based on the vehicle system information conveyed in the vehicle control data 14. At 214, the translation module 134 compares the control value with the respective constraints. If the control value violates the constraints, control proceeds at 216, otherwise, control proceeds at 218. At 216, the translation module 134 applies the constraints to the control value of the vehicle control data 14 to obtain a respective control value (or control values) for the vehicle control data 140. At 218, the translation module 134 adopts the control value of the vehicle control data 14 as a control value of the vehicle control data 140.

Returning to FIG. 5, at 222, the adjustment module 136 updates the driver-based parameter tables 124 for the particular driver based on the vehicle control data 140. More specifically, the adjustment module 136 stores the control values determined as new control values in the corresponding driver-based parameter tables 124. An end of the method is designated at 224.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system of a first vehicle, comprising:
a communication module that receives first vehicle control data generated based on operation of a second vehicle by a driver,
wherein the first and second vehicles are different;
a driver identification module that selectively indicates whether the driver is operating the first vehicle;
a parameter module that:
when the driver identification module indicates that the driver is operating the first vehicle, determines second vehicle control data based on the first vehicle control data and first characteristics of the first vehicle and selectively adjusts the second vehicle control data based on driver input to the first vehicle; and
when the driver identification module indicates that a driver of the first vehicle is unknown, selectively adjusts third vehicle control data based on the driver input to the first vehicle; and
an actuator module that:
when the driver identification module indicates that the driver is operating the first vehicle controls at least one actuator of the first vehicle based on the second vehicle control data; and
when the driver identification module indicates that the driver of the first vehicle is unknown, controls the at least one actuator of the first vehicle based on the third vehicle control data.

2. A communications system comprising:
the system of claim 1; and
a server that wirelessly receives the first vehicle control data from the second vehicle and that wirelessly transmits the first vehicle control data to the first vehicle.

3. A communication system comprising:
the system of claim 1; and
a mobile device that receives the first vehicle control data from the second vehicle, that stores the first vehicle control data, and that communicates the first vehicle control data to the first vehicle.

4. The communication system of claim 3 wherein the mobile device receives the first vehicle control data wirelessly from the second vehicle and communicates the first vehicle control data wirelessly to the first vehicle.

5. The communication system of claim 3 wherein the mobile device receives the first vehicle control data from the second vehicle via a universal serial bus (USB) connection between the mobile device and the second vehicle, and
wherein the communication module receives the first vehicle control data from the mobile device via a USB connection between the mobile device and the first vehicle.

6. The system of claim 1 wherein the communication module establishes a wireless short range communication connection with the second vehicle and receives the first vehicle control data via the wireless short range communication connection.

7. The system of claim 1 wherein a translation module determines the second vehicle control data further based on second characteristics of the second vehicle.

8. The system of claim 1 wherein the at least one actuator includes at least one of an engine actuator, a transmission actuator, a steering actuator, and a suspension actuator based on the second vehicle control data.

9. The system of claim 1 wherein the actuator module controls the at least one actuator further based on the driver input to the first vehicle.

10. The system of claim 1 wherein the driver input includes at least one of an accelerator pedal position, a brake pedal position, a cruise control input, a steering wheel position, and a transmission gear selector position.

11. A method of controlling a first vehicle, comprising:
receiving first vehicle control data generated based on operation of a second vehicle by a driver,
wherein the first and second vehicles are different;
indicating whether the driver is operating the first vehicle;
in response to an indication that the driver is operating the first vehicle:
determining second vehicle control data based on the first vehicle control data and first characteristics of the first vehicle; and
selectively adjusting the second vehicle control data based on driver input to the first vehicle;
in response to an indication that a driver of the first vehicle is unknown, selectively adjusting third vehicle control data based on the driver input to the first vehicle;
in response to the indication that the driver is operating the first vehicle, controlling at least one actuator of the first vehicle based on the second vehicle control data; and
in response to the indication that the driver of the first vehicle is unknown, controlling the at least one actuator of the first vehicle based on the third vehicle control data.

12. The method of claim 11 further comprising wirelessly receiving the first vehicle control data from a server,
wherein the server wirelessly receives the first vehicle control data from the second vehicle.

13. The method of claim 11 further comprising receiving the first vehicle control data from a mobile device,
wherein the mobile device receives the first vehicle control data from the second vehicle, stores the first vehicle control data, and communicates the first vehicle control data to the first vehicle.

14. The method of claim 13 wherein the mobile device receives the first vehicle control data wirelessly from the second vehicle and communicates the first vehicle control data wirelessly to the first vehicle.

15. The method of claim 13 further comprising receiving the first vehicle control data via a universal serial bus (USB) connection between the mobile device and the first vehicle,
wherein the mobile device receives the first vehicle control data from the second vehicle via a USB connection between the mobile device and the second vehicle.

16. The method of claim 11 further comprising:
establishing a wireless short range communication connection with the second vehicle; and
receiving the first vehicle control data via the wireless short range communication connection.

17. The method of claim 11 further comprising determining the second vehicle control data further based on second characteristics of the second vehicle.

18. The method of claim 11 wherein the at least one actuator includes at least one of an engine actuator, a transmission actuator, a steering actuator, and a suspension actuator based on the second vehicle control data.

19. The method of claim 11 wherein the actuator module controls the at least one actuator further based on the driver input to the first vehicle.

20. The method of claim 11 wherein the driver input includes at least one of an accelerator pedal position, a brake pedal position, a cruise control input, a steering wheel position, and a transmission gear selector position.

\* \* \* \* \*